United States Patent
Heaton

(10) Patent No.: US 9,883,665 B2
(45) Date of Patent: Feb. 6, 2018

(54) PHOSPHORESCENT FISHING LURE ENERGIZING STORAGE DEVICE

(71) Applicant: Danny A. Heaton, Watertown, SD (US)

(72) Inventor: Danny A. Heaton, Watertown, SD (US)

( * ) Notice: Subject to any disclaimer, the term of this patent is extended or adjusted under 35 U.S.C. 154(b) by 213 days.

(21) Appl. No.: 14/803,825

(22) Filed: Jul. 20, 2015

(65) Prior Publication Data

US 2016/0015017 A1    Jan. 21, 2016

Related U.S. Application Data

(60) Provisional application No. 62/026,907, filed on Jul. 21, 2014.

(51) Int. Cl.
  *A01K 97/06*    (2006.01)
  *A01K 85/01*    (2006.01)
  *A01K 97/04*    (2006.01)

(52) U.S. Cl.
  CPC .............. *A01K 97/06* (2013.01); *A01K 85/01* (2013.01); *A01K 97/04* (2013.01)

(58) Field of Classification Search
  CPC ................................ A01K 97/06; A01K 85/01
  USPC .............. 43/17.5, 17.6, 54.1, 57.1; 362/154
  See application file for complete search history.

(56) References Cited

U.S. PATENT DOCUMENTS

| | | | | |
|---|---|---|---|---|
| 1,577,566 A | * | 3/1926 | Stevens | A01K 97/06 43/57.2 |
| 2,290,419 A | * | 7/1942 | Dunn | A01K 97/06 362/156 |
| 2,517,914 A | * | 8/1950 | Nowaczek | A01K 97/06 362/155 |
| 2,750,706 A | * | 6/1956 | Seals | A01K 97/06 43/57.2 |
| 2,751,489 A | * | 6/1956 | Cole | A01K 97/06 43/17.5 |
| 2,765,576 A | * | 10/1956 | Kurek | A01K 97/06 43/54.1 |

(Continued)

FOREIGN PATENT DOCUMENTS

| | | | | |
|---|---|---|---|---|
| EP | 2160944 A1 | * | 3/2010 | ............ A01K 97/06 |
| GB | 1259697 A | * | 1/1972 | ............ A01K 97/06 |

(Continued)

OTHER PUBLICATIONS

Translation of JP 09-132.*
Translation of JP 2002-360126.*

*Primary Examiner* — Darren W Ark

(57) ABSTRACT

A phosphorescent fishing lure energizing storage device for exposing phosphorescent fishing lures to light while is stored such that the phosphorescent fishing lures are energized and fluoresce while is used after removal from the storage device includes a container defining an interior space. A lid is coupled to the container. The lid is positionable to cover the interior space. A holder is positioned in the interior space and configured for holding at least one phosphorescent fishing lure having a body charged by exposure to light. A light source is coupled to the lid such that the light source illuminates the interior space wherein the light source is configured for energizing the body of the phosphorescent fishing lure.

17 Claims, 5 Drawing Sheets

(56) References Cited

U.S. PATENT DOCUMENTS

| | | | | | |
|---|---|---|---|---|---|
| 3,346,733 | A | * | 10/1967 | Woolworth | B25H 3/023 362/156 |
| 3,461,599 | A | * | 8/1969 | Sylvester | A01K 97/06 43/57.1 |
| 3,490,169 | A | * | 1/1970 | Tweed | A01K 97/06 43/57.1 |
| 3,938,132 | A | * | 2/1976 | Cunningham | A01K 97/06 43/17.5 |
| 4,240,222 | A | * | 12/1980 | Covington | A01K 97/06 43/57.1 |
| 4,621,308 | A | * | 11/1986 | Holmberg | A01K 97/06 206/315.1 |
| 4,691,470 | A | * | 9/1987 | Landell | A01K 97/06 43/17.5 |
| 4,697,379 | A | * | 10/1987 | McPhaul | A01K 97/06 43/54.1 |
| 5,311,413 | A | * | 5/1994 | Farmer | F21V 33/008 43/17.6 |
| 5,333,408 | A | * | 8/1994 | Simmons | A01K 97/06 43/17.5 |
| 5,388,039 | A | * | 2/1995 | Dolph | F21V 33/008 43/17.6 |
| 5,505,354 | A | * | 4/1996 | Hutton | A01K 97/06 206/315.11 |
| 5,526,927 | A | * | 6/1996 | McLemore | A01K 97/06 206/315.11 |
| 5,611,170 | A | * | 3/1997 | McGuff | A01K 97/06 43/57.1 |
| 5,624,029 | A | * | 4/1997 | Shih | B25H 3/02 43/17.5 |
| 6,079,148 | A | * | 6/2000 | Yonenoi | A01K 97/06 43/57.1 |
| 6,193,062 | B1 | * | 2/2001 | Rysgaard | A01K 97/06 43/54.1 |
| 6,267,484 | B1 | * | 7/2001 | Baker | A01K 97/06 362/156 |
| 6,427,834 | B1 | * | 8/2002 | Lin | A01K 97/06 43/54.1 |
| 6,527,113 | B2 | * | 3/2003 | Blake | A01K 97/06 206/315.11 |
| 6,684,557 | B1 | * | 2/2004 | Yu | A01K 85/01 43/17.6 |
| 6,766,610 | B1 | * | 7/2004 | Lin | A01K 97/06 43/57.1 |
| 6,915,899 | B2 | * | 7/2005 | Lin | A01K 97/06 43/57.1 |
| 6,920,977 | B1 | * | 7/2005 | VanSkiver | A63B 71/0036 43/54.1 |
| 6,922,935 | B2 | * | 8/2005 | Yu | A01K 85/01 43/17.6 |
| 6,981,780 | B2 | * | 1/2006 | Einav | B25H 3/02 362/154 |
| 7,055,983 | B1 | * | 6/2006 | Baker | A01K 97/06 362/156 |
| 7,080,477 | B2 | * | 7/2006 | Shannon | A01K 97/06 43/57.1 |
| 7,089,698 | B2 | * | 8/2006 | Afshari | A01K 85/01 43/17.5 |
| 7,290,897 | B2 | * | 11/2007 | Schmidt | A01K 97/00 362/190 |
| 7,364,318 | B1 | * | 4/2008 | Cruze | A01K 85/01 362/154 |
| 7,621,074 | B2 | * | 11/2009 | Glidewell | A01K 97/06 43/57.1 |
| 7,748,158 | B2 | * | 7/2010 | Wieringa | A01K 97/06 43/57.1 |
| 7,984,997 | B1 | * | 7/2011 | Sandberg | F25D 27/005 362/155 |
| 8,016,106 | B2 | * | 9/2011 | Schmitt | A01K 97/06 43/57.1 |
| 8,403,517 | B1 | * | 3/2013 | Cox | A63B 43/06 362/154 |
| 8,424,235 | B1 | * | 4/2013 | Anderson | A01K 85/01 43/17.6 |
| 8,707,612 | B2 | * | 4/2014 | Konz | A01K 97/04 43/17.5 |
| 8,979,297 | B2 | * | 3/2015 | Statham | F25D 27/00 362/154 |
| 9,249,954 | B2 | * | 2/2016 | Johnson | A01K 85/01 |
| 2007/0234636 | A1 | * | 10/2007 | Schwartz | A01K 97/06 43/54.1 |
| 2010/0170139 | A1 | * | 7/2010 | Zhou | A01K 97/06 43/54.1 |
| 2016/0021861 | A1 | * | 1/2016 | Pippins | A01K 97/06 43/17.5 |

FOREIGN PATENT DOCUMENTS

| | | | |
|---|---|---|---|
| JP | 09000132 A | * | 1/1997 |
| JP | 09047202 A | * | 2/1997 |
| JP | 11289944 A | * | 10/1999 |
| JP | 2002360126 A | * | 12/2002 |
| JP | 2010136673 A | * | 6/2010 |

* cited by examiner

PHOSPHORESCENT FISHING LURE ENERGIZING STORAGE DEVICE

BACKGROUND OF THE DISCLOSURE

Field of the Disclosure

The disclosure relates to fishing lure storage devices and more particularly pertains to a new fishing lure storage device for exposing phosphorescent fishing lures to light while being stored such that the phosphorescent fishing lures are energized and fluoresce while being used immediately after removal from the storage device.

SUMMARY OF THE DISCLOSURE

An embodiment of the disclosure meets the needs presented above by generally comprising a container defining an interior space. A lid is coupled to the container. The lid is positionable to cover the interior space. A holder is positioned in the interior space and configured for holding at least one phosphorescent fishing lure having a body charged by exposure to light. A light source is coupled to the lid such that the light source illuminates the interior space wherein the light source is configured for energizing the body of the phosphorescent fishing lure.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
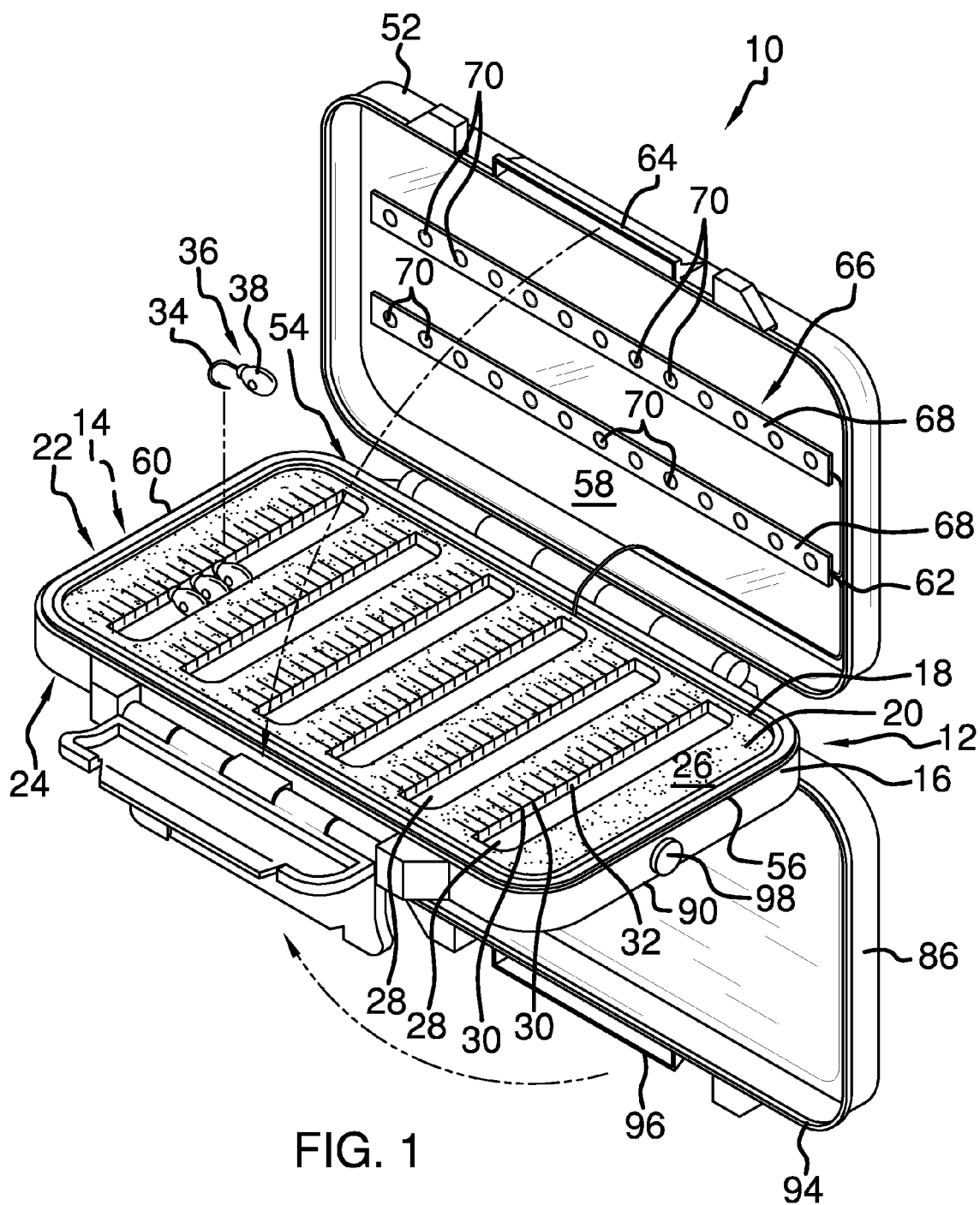
FIG. 1 is a top front side perspective view of a phosphorescent fishing lure energizing storage device according to an embodiment of the disclosure.
Figure 2:
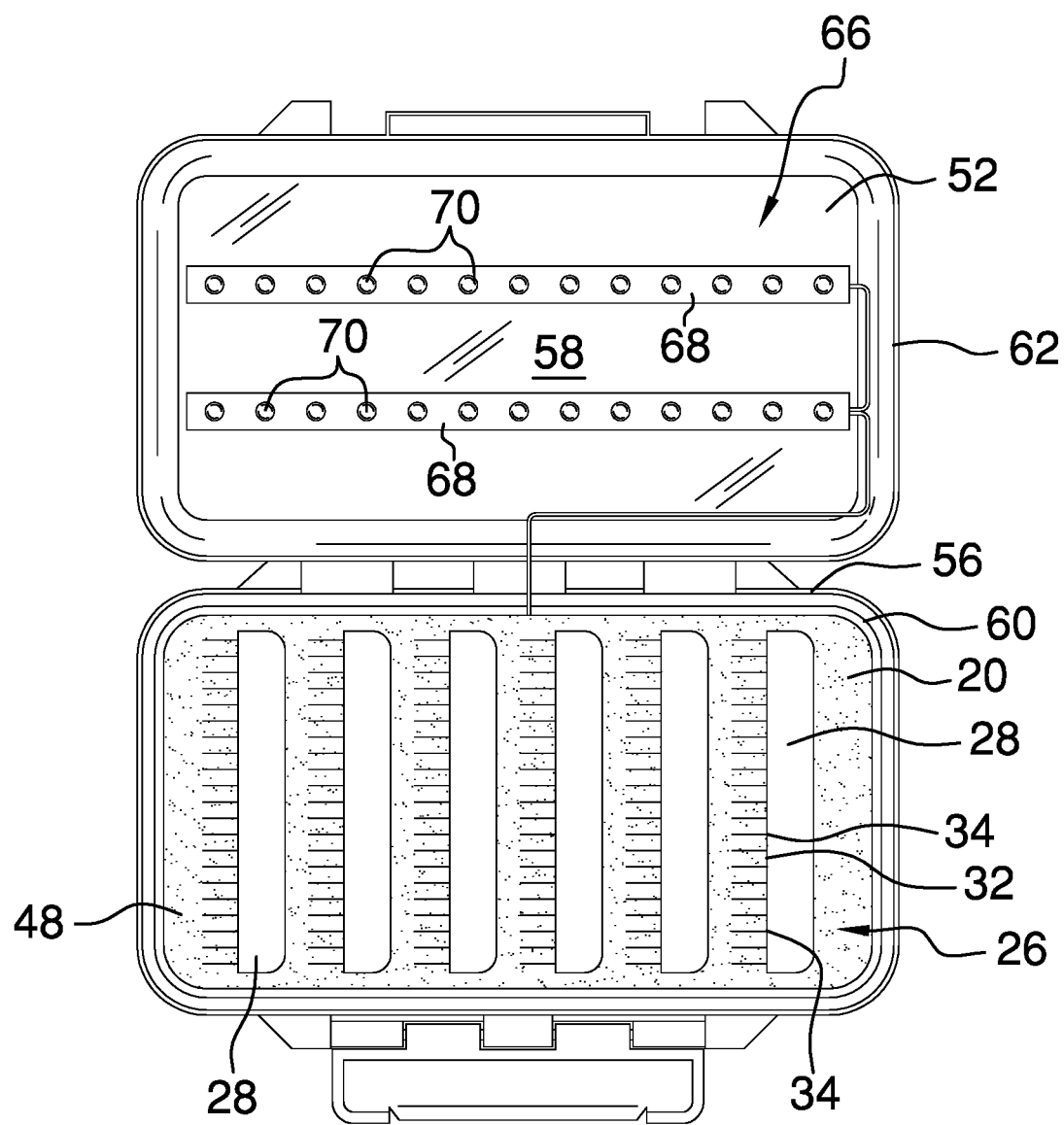
FIG. 2 is a top view of an embodiment of the disclosure in an open position.
Figure 3:
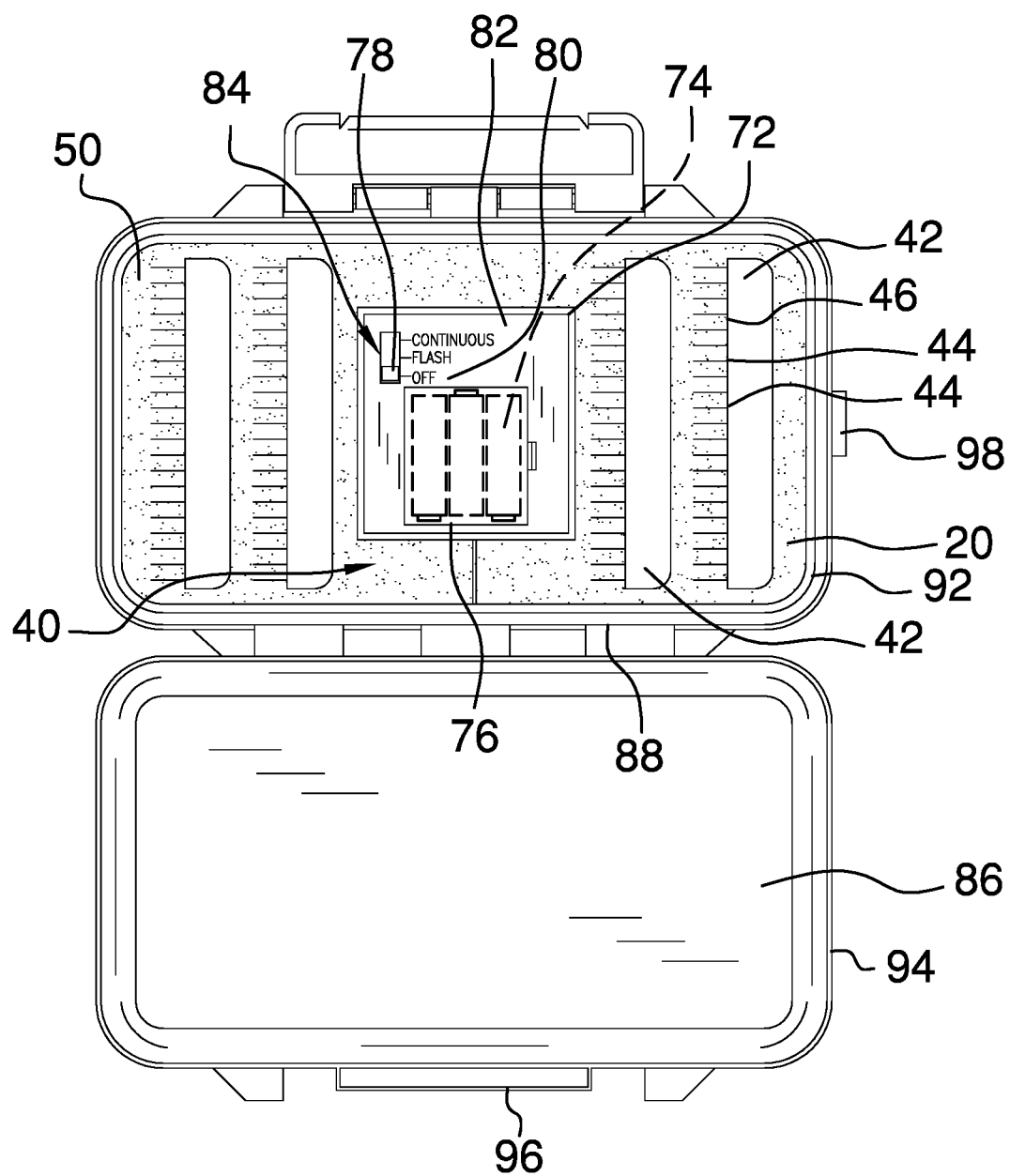
FIG. 3 is a bottom view of an embodiment of the disclosure in an open position.
Figure 4:
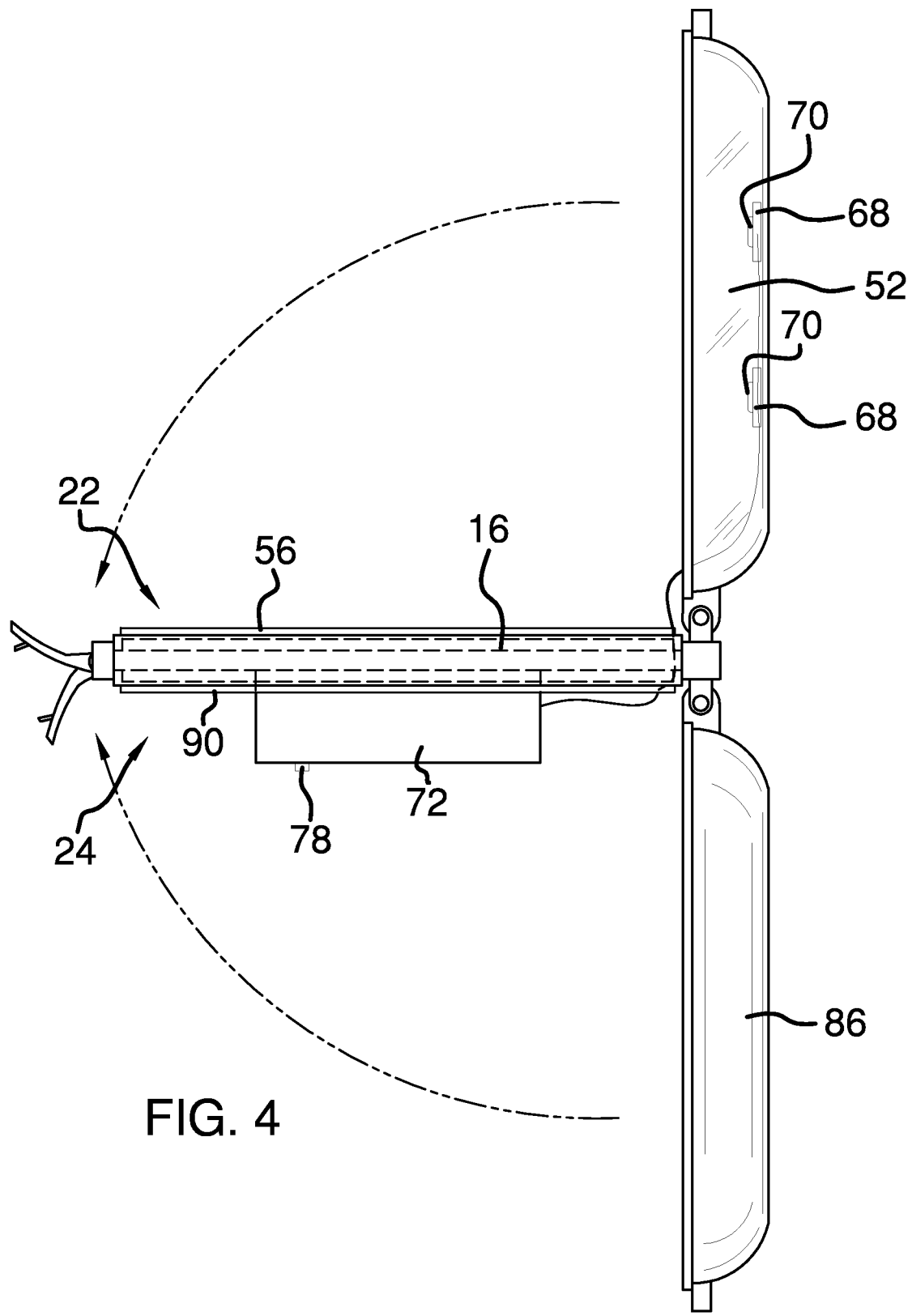
FIG. 4 is a side view of an embodiment of the disclosure in an open position.
Figure 5:
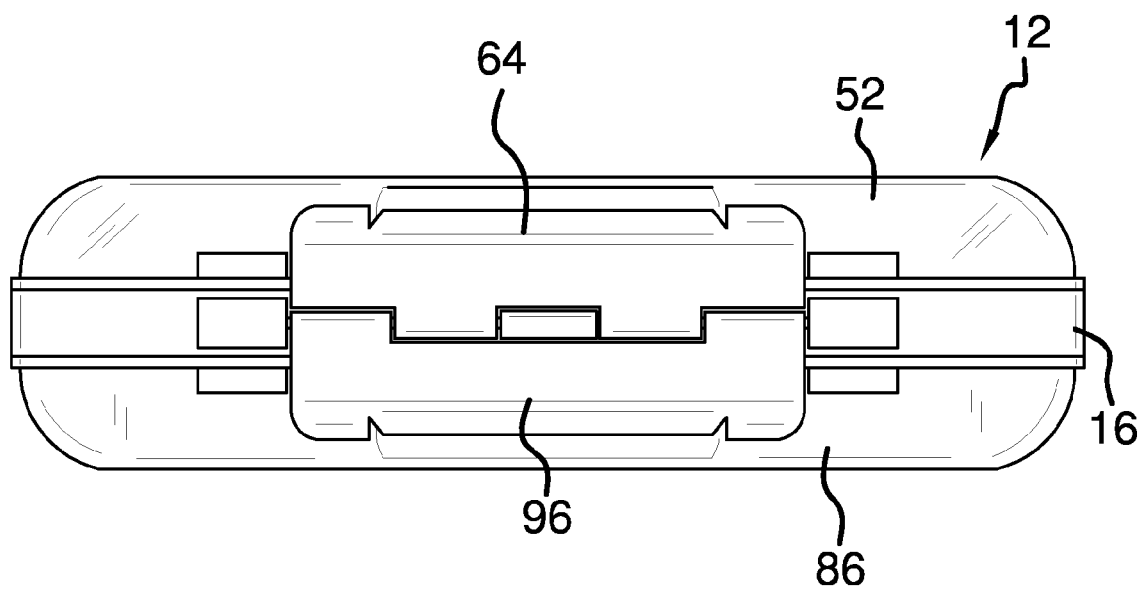
FIG. 5 is a front view of an embodiment of the disclosure in a closed position.

With reference now to the drawings, and in particular to FIGS. 1 through 5 thereof, a new fishing lure storage device embodying the principles and concepts of an embodiment of the disclosure and generally designated by the reference numeral 10 will be described.

As best illustrated in FIGS. 1 through 5, the phosphorescent fishing lure energizing storage device 10 generally comprises a container 12 defining an interior space 14. The container 12 has a perimeter wall 16 defining an exterior perimeter 18 of the interior space 14. A holder 20 is coupled to the container 12. The holder 20 is positioned in and extends through the interior space 14. The holder 20 defines an upper compartment 22 and a lower compartment 24 within the interior space 14. A first face 26 of the holder 20 is contoured to define a plurality of upper channels 28 extending into the holder 20. The first face 26 of the holder 20 is contoured to define a plurality of upper slots 30 extending into the holder 20. Each upper slot 30 extends from an edge 32 of an associated one of the upper channels 28. Each upper slot 30 is configured for receiving and frictionally engaging a hook 34 of a respective phosphorescent fishing lure 36 such that a body 38 of the phosphorescent fishing lure 36 is positioned in the associated upper channel 28 in spaced relationship to a surface of the holder 20. A second face 40 of the holder 20 is contoured to define a plurality of lower channels 42 extending into the holder 20. The second face 40 of the holder 20 is contoured to define a plurality of lower slots 44 extending into the holder 20. Each lower slot 44 extends from an edge 46 of an associated one of the lower channels 42. Each lower slot 44 is configured for receiving and frictionally engaging the hook 34 of a respective phosphorescent fishing lure 36 such that the body 38 of the phosphorescent fishing lure 36 is positioned in the associated lower channel 42. The first face 26 of the holder 20 is defined by a first layer 48 of foam material. The second face 40 of the holder 20 is defined by a second layer 50 of foam material.

A lid 52 is pivotally coupled to a longitudinal edge 54 of a first side 56 of the container 12. The lid 52 is positionable to cover the upper compartment 22 of the interior space 14 wherein an interior surface 58 of the lid 52 is positioned facing the first face 26 of the holder 20. The lid 52 is substantially clear wherein the holder 20 is visible looking through the lid 52 while the lid 52 is in a closed position. A lid seal 60 is coupled to the perimeter wall 16 abutting a peripheral edge 62 of the lid 52 when the lid 52 is in the closed position. A lid latch 64 is coupled to the container 12 engaging the lid 52 wherein the lid latch 64 secures the lid 52 in the closed position.

A light source 66 is coupled to the interior surface 58 of the lid 52 such that the light source 66 illuminates the upper compartment 22 of the interior space 14 when the lid 52 is in the closed position and the light source 66 is activated. Thus, the light source 66 is configured for energizing the body 38 of the phosphorescent fishing lure 36. The light source 66 comprises a pair of strips 68. A respective plurality of light emitting diodes 70 is coupled to and extends along a length of each strip 68. Each strip 68 extends longitudinally across the lid 52. The strips 68 are parallel and inwardly positioned relative to an associated longitudinal side of the lid 52. The light emitting diodes 70 may be adjustable to emit a selectable wavelength of light to best energize particular fishing lures 36 positioned in the upper compartment 22.

A housing 72 is coupled to the perimeter wall 16 and the holder 20. The housing 72 extends from the second face 40 of the holder 20. A battery 74 is coupled to and positioned in the housing 72. The battery 74 is electrically coupled to the light source 66. The battery 74 is accessible through a battery door 76 coupled to the housing 74. A switch 78 is electrically coupled between the battery 74 and the light source 66 wherein the switch 78 controls activation of the light source 66. The switch 78 has an off position 80 wherein the light source 66 is deactivated. The switch 78 has an on position 82 wherein the light source 66 is activated and provides constant illumination. The switch 78 has a flash position 84 wherein the light source 66 is intermittently activated and provides intermittent illumination. The switch 78 is positioned on the housing 72;

A bottom 86 is pivotally coupled to a longitudinal edge 88 of a second side 90 of the container 12 wherein the bottom 86 is positionable in a closed position covering the lower compartment 24 of the interior space 14 of the container 12. The bottom 86 is opaque. The bottom 86 covers the housing 72 when the bottom 86 is in the closed position. A bottom seal 92 is coupled to the perimeter wall 16. The bottom seal 92 abuts a peripheral edge 94 of the bottom 86 when the bottom 86 is in the closed position. A bottom latch 96 engages the bottom 86 wherein the bottom latch 96 secures the bottom 86 in the closed position.

An exterior light 98 may be attached to the container 12 and directed in a beam outwardly from the container 12 for use in the manner of a flashlight. The exterior light 98 may also be intermittently activated if so desired to indicate distress or the need for help.

In use, fishing lures 36 are secured in the container 12 in the upper compartment 22. The light source 66 is activated to energize the body 38 of each fishing lure 36 in the upper compartment 22. Used fishing lures 36 or fishing lures 36 not otherwise needing to be energized or used may also be stored in the lower compartment 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phosphorescent lure storage device comprising:
a container defining an interior space;
a holder coupled to said container, said holder being positioned in and extending through said interior space;
a lid coupled to said container, said lid being positionable to cover said interior space;
a light source coupled to said lid such that said light source illuminates said interior space wherein said light source is configured for energizing a body of a phosphorescent fishing lure;
a first face of said holder being contoured to define a plurality of upper channels extending into said holder, said first face of said holder being contoured to define a plurality of upper slots extending into said holder, each said upper slot extending from an edge of an associated one of said upper channels, each said upper slot being configured for receiving and frictionally engaging a hook of a respective phosphorescent lure such that a body of the phosphorescent lure is positioned in said associated upper channel in spaced relationship to a surface of said holder;
a second face of said holder being contoured to define a plurality of lower channels extending into said holder, said second face of said holder being contoured to define a plurality of lower slots extending into said holder, each said lower slot extending from an edge of an associated one of said lower channels, each said lower slot being configured for receiving and frictionally engaging the hook of a respective phosphorescent lure such that a body of the phosphorescent lure is positioned in said associated lower channel;
a housing coupled to said holder, said housing extending from said second face of said holder; and
a battery coupled to and positioned in said housing, said battery being electrically coupled to a light source, said battery being accessible through a battery door coupled to said housing.

2. The device of claim 1, further comprising:
said container having a perimeter wall defining an exterior perimeter of said interior space; and
said holder defining an upper compartment and a lower compartment within said interior space.

3. The device of claim 2, wherein said first face of said holder is defined by a layer of foam material.

4. The device of claim 2, further comprising said lid being pivotally coupled to a longitudinal edge of a first side of said container, said lid being positionable to cover said upper compartment of said interior space wherein an interior side of said lid is positioned facing said first face of said holder.

5. The device of claim 2, further comprising said light source being coupled to an interior surface of said lid such that said light source illuminates said upper compartment of said interior space when said lid is in a closed position and said light source is activated wherein said light source is configured for energizing the body of the phosphorescent lure.

6. The device of claim 5, further comprising said light source comprising a pair of strips, a respective plurality of light emitting diodes being coupled to and extending along a length of each said strip.

7. The device of claim 6, further comprising each said strip extending longitudinally across said lid, said strips being parallel, each of said strips being inwardly positioned relative to an associated longitudinal side of said lid.

8. The device of claim 2, further comprising:
said container having a first side and a second side; and
a bottom pivotally coupled to a longitudinal edge of said second side of said container wherein said bottom is positionable in a closed position covering said lower compartment of said interior space of said container.

9. The device of claim 8, further comprising said bottom being opaque, said bottom covering said housing coupled to said holder when said bottom is in said closed position.

10. The device of claim 9, further comprising:
a bottom seal coupled to said perimeter wall, said bottom seal abutting a peripheral edge of said bottom when said bottom is in said closed position; and
a bottom latch, said bottom latch engaging said bottom wherein said bottom latch secures said bottom in said closed position.

11. The device of claim 1, further comprising:
said first face of said holder being defined by a first layer of foam material; and said second face of said holder being defined by a second layer of foam material.

12. The device of claim 1, further comprising said lid being substantially clear wherein said holder is visible looking through said lid while said lid is in a closed position.

13. The device of claim 12, further comprising a lid latch coupled to said container, said lid latch engaging said lid wherein said lid latch secures said lid in said closed position.

14. The device of claim 12, further comprising a lid seal coupled to said perimeter wall, said lid seal abutting a peripheral edge of said lid when said lid is in said closed position.

15. The device of claim 1, further comprising a switch being positioned on said housing, said switch being electrically coupled between said battery and said light source wherein said switch controls activation of said light source, said switch having an off position wherein said light source is deactivated, said switch having an on position wherein said light source is activated and provides constant illumination.

16. The device of claim 15, further comprising said switch having a flash position wherein said light source is intermittently activated and provides intermittent illumination.

17. A phosphorescent lure storage device comprising:
- a container defining an interior space, said container having a perimeter wall defining an exterior perimeter of said interior space;
- a holder coupled to said container, said holder being positioned in and extending through said interior space, said holder defining an upper compartment and a lower compartment within said interior space, a first face of said holder being contoured to define a plurality of upper channels extending into said holder, said first face of said holder being contoured to define a plurality of upper slots extending into said holder, each said upper slot extending from an edge of an associated one of said upper channels, each said upper slot being configured for receiving and frictionally engaging a hook of a respective phosphorescent lure such that a body of the phosphorescent lure is positioned in said associated upper channel in spaced relationship to a surface of said holder, a second face of said holder being contoured to define a plurality of lower channels extending into said holder, said second face of said holder being contoured to define a plurality of lower slots extending into said holder, each said lower slot extending from an edge of an associated one of said lower channels, each said lower slot being configured for receiving and frictionally engaging the hook of a respective phosphorescent lure such that a body of the phosphorescent lure is positioned in said associated lower channel;
- wherein said first face of said holder is defined by a first layer of foam material, said second face of said holder being defined by a second layer of foam material;
- a lid pivotally coupled to a longitudinal edge of a first side of said container, said lid being positionable to cover said upper compartment of said interior space wherein an interior side of said lid is positioned facing said first face of said holder, said lid being substantially clear wherein said holder is visible looking through said lid while said lid is in a closed position;
- a lid seal coupled to said perimeter wall, said lid seal abutting a peripheral edge of said lid when said lid is in said closed position;
- a lid latch coupled to said container, said lid latch engaging said lid wherein said lid latch secures said lid in said closed position;
- a light source coupled to an interior surface of said lid such that said light source illuminates said upper compartment of said interior space when said lid is in said closed position and said light source is activated wherein said light source is configured for energizing the body of the phosphorescent lure, said light source comprising a pair of strips, a respective plurality of light emitting diodes being coupled to and extending along a length of each said strip, each said strip extending longitudinally across said lid, said strips being parallel, each of said strips being inwardly positioned relative to an associated longitudinal side of said lid;
- a housing coupled to said holder, said housing extending from said second face of said holder;
- a battery coupled to and positioned in said housing, said battery being electrically coupled to said light source, said battery being accessible through a battery door coupled to said housing;
- a switch electrically coupled between said battery and said light source wherein said switch controls activation of said light source, said switch having an off position wherein said light source is deactivated, said switch having an on position wherein said light source is activated and provides constant illumination, said switch having a flash position wherein said light source is intermittently activated and provides intermittent illumination, said switch being positioned on said housing;
- a bottom pivotally coupled to a longitudinal edge of a second side of said container wherein said bottom is positionable in a closed position covering said lower compartment of said interior space of said container, said bottom being opaque, said bottom covering said housing when said bottom is in said closed position;
- a bottom seal coupled to said perimeter wall, said bottom seal abutting a peripheral edge of said bottom when said bottom is in said closed position; and
- a bottom latch, said bottom latch engaging said bottom wherein said bottom latch secures said bottom in said closed position.

* * * * *